W. H. CURTISS.
Thill Coupling.
No. 84,265.
Patented Nov. 24, 1868.
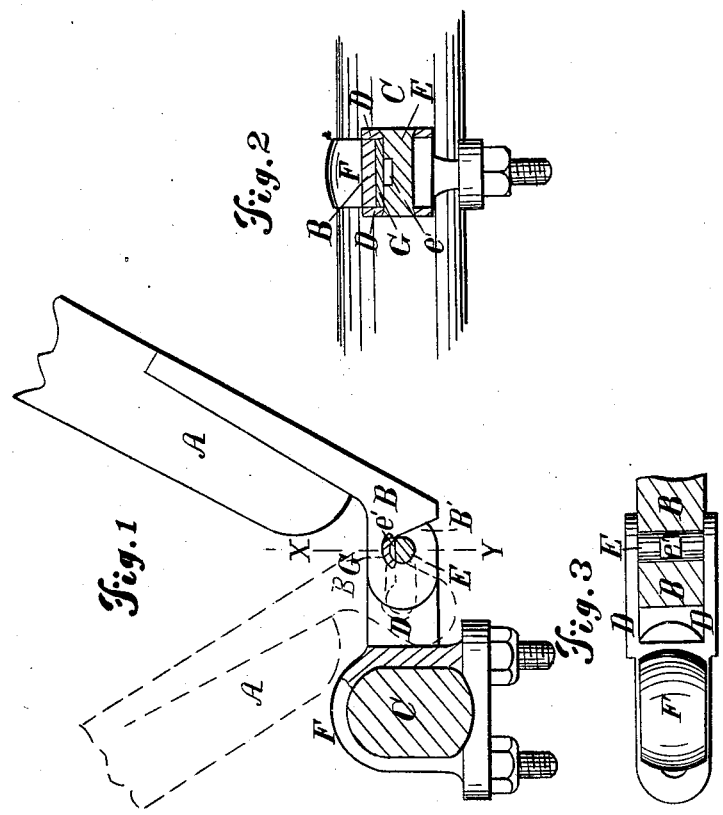

WILLIAM H. CURTISS, OF PAINESVILLE, OHIO.

Letters Patent No. 84,265, dated November 24, 1868.

IMPROVEMENT IN THILL-COUPLING.

The Schedule referred to in these Letters Patent and making part of the same.

*To all whom it may concern:*

Be it known that I, WILLIAM H. CURTISS, of Painesville, in the county of Lake, and State of Ohio, have invented a certain new and improved Device for Hinging Buggy-Thills; and I do hereby declare that the following is a full, clear, and exact description thereof, reference being had to the accompanying drawing, making a part of this specification, in which—

Figure I is a side elevation, partially in section, of said device.

Figure II is a section on line X-Y of Fig. I.

Figure III is a top plan view.

This invention relates to a means of securing buggy-thills to axle-trees, which will permit the quick and easy connection or disconnection thereof, without requiring the removal of bolts or pins, and which shall be secure against disconnection by the loss or breakage of bolts or pins, as in the common forms of fastenings.

The nature of the invention consists in providing each thill-end with a hook having its mouth smaller than the eye thereof, in combination with a joint-bolt flattened upon one side, so that it may pass through the contracted mouth into the eye of the hook; the angle of said hook to the thill and with reference to the flattened side of the joint-bolt (which is made a fixture to the axle-tree) being such that it will pass the joint-bolt only when the thills are raised to a vertical position, (or nearly so,) so that when the thills are brought into their proper horizontal position, the hooks lock with the joint-bolts, and the thills are securely connected.

Like letters refer to like parts in each of the figures.

A represents a thill-end, and

B, the hook attached thereto.

C represents the axle-tree, and

D, a jaw holding the joint-bolt E, said jaw being formed with the clip F, by which it is connected to the axle-tree.

The mouth of the hook B is contracted by a projecting key or feather, B', and the upper side of the joint-bolt is notched or flattened, as shown at $e'$. The diameter of the eye of the hook equals that of the joint-bolt, and the projection of the key B' equals the depth of the notch $e'$, so that when brought into proper position with each other, the hook may pass over the joint-bolt, the angle of the hook to the thill being such that this position will require the thills to be raised into a vertical position, or nearly so, as shown by the red lines in Fig. I.

The joint-bolt being passed into the eye of the hook, and the thill brought down into its proper horizontal position, the key B' will pass around beyond the notch $e'$, and thereby securely lock the thill upon the joint-bolt, from which it can only be disconnected by raising it again into the vertical position.

The joint-bolt being a fixture in the jaw, cannot be lost or readily broken.

A recess is formed at the bottom of the hook for the reception of a leather or rubber washer, G, by which the hook may be made to fit snugly to the joint-bolt, and any jar or rattle in the joint prevented. This washer may be easily renewed, when required.

The great facility with which thills provided with my device may be connected or disconnected from the axle-tree, and the certainty and durability of the connection formed, render it a great improvement upon the devices now in use for that purpose.

Having thus described my invention,

What I claim, and desire to secure by Letters Patent, is—

The combination of the hook B and its key B' with the rigid joint-bolt E and its notch $e'$, when arranged and operating in the manner and for the purpose set forth.

WM. H. CURTISS.

Witnesses:
JAS. E. MCHENRY,
HENRY P. WHITE.